UNITED STATES PATENT OFFICE.

ERNST H. RICHTER, OF TAUNTON, MASSACHUSETTS.

IMPROVEMENT IN COMPOSITIONS FOR FIRE-BRICK, STOVE-LININGS, &c.

Specification forming part of Letters Patent No. 153,017, dated July 14, 1874; application filed May 25, 1874.

*To all whom it may concern:*

Be it known that I, ERNST H. RICHTER, of Taunton, in the county of Bristol and State of Massachusetts, have invented a new and Improved Composition for Fire-Brick, Stove-Lining, &c., of which the following is a specification:

This invention relates to a new composition for producing a superior style of fire-brick, stove-lining, &c., that will be light, durable, and not liable to clinker.

The composition is produced from the following-named ingredients, in about the proportions set forth, to wit: One hundred parts fire-clay; thirty parts fire-sand; three parts lime.

These ingredients are properly pulverized, mixed, molded, and burnt; and produce a fire-brick or lining in every respect superior in aspect and quality.

The lime may be either limestone, dissolved or crumbled, or gas-house lime.

As the fire-sand is only used to give greater body to the mixture, it is evident that in its stead substantially the same proportion of raw or burnt mica, ashes, or other equivalent substance may be used.

I claim as my invention—

The stove-lining or fire-brick, composed of fire-clay, fire-sand, and lime, substantially as described.

ERNST H. RICHTER.

Witnesses:
    GEORGE H. BABBITT, Jr.,
    GEORGE R. HUNTLEY.